(12) United States Patent
Stegelmann

(10) Patent No.: US 6,841,921 B2
(45) Date of Patent: Jan. 11, 2005

(54) ULTRASONIC HORN ASSEMBLY STACK COMPONENT CONNECTOR

(75) Inventor: Norman R. Stegelmann, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 3 days.

(21) Appl. No.: 10/287,310

(22) Filed: Nov. 4, 2002

(65) Prior Publication Data

US 2004/0084995 A1 May 6, 2004

(51) Int. Cl.[7] ............................ H01L 41/08; B29C 65/08
(52) U.S. Cl. ............................... 310/323.19; 156/580.2
(58) Field of Search .................... 310/323.19; 156/580.2

(56) References Cited

U.S. PATENT DOCUMENTS

| | | | |
|---|---|---|---|
| 1,066,421 A | 7/1913 | Russell | 403/296 |
| 1,928,925 A | 9/1933 | Wescott | 403/296 |
| 2,286,550 A | 8/1942 | Kelly et al. | 294/86.1 |
| 3,405,592 A | 10/1968 | Biodee | 411/389 |
| 3,780,926 A | 12/1973 | Davis | 228/1.1 |
| 3,937,990 A | 2/1976 | Winston | 310/325 |
| 4,743,138 A | 5/1988 | Goy | 403/337 |
| 5,087,320 A * | 2/1992 | Neuwirth | 156/580.2 |
| 5,096,532 A | 3/1992 | Neuwirth et al. | 156/580.1 |
| 5,110,403 A | 5/1992 | Ehlert | 156/580.1 |
| 5,171,387 A | 12/1992 | Wuchinich | 156/73.3 |
| 5,385,288 A | 1/1995 | Kyomasu et al. | 228/1.1 |
| 5,552,013 A | 9/1996 | Ehlert et al. | 156/555 |
| 5,562,790 A | 10/1996 | Ehlert et al. | 156/23.1 |
| 5,645,681 A * | 7/1997 | Gopalakrishna et al. | 156/580.2 |
| 5,772,100 A | 6/1998 | Patrikios | 228/1.1 |
| 5,793,148 A * | 8/1998 | R.ang.be | 310/328 |
| 5,828,156 A * | 10/1998 | Roberts | 310/317 |
| 5,883,460 A * | 3/1999 | Sato et al. | 310/348 |
| 5,976,316 A | 11/1999 | Mlinar et al. | 156/580.2 |
| 6,277,224 B1 * | 8/2001 | Muesch et al. | 156/73.3 |

FOREIGN PATENT DOCUMENTS

| | | | |
|---|---|---|---|
| EP | 1 050 347 A2 | 11/2000 | B06B/1/06 |
| GB | 2 030 819 A | 4/1980 | B21C/3/12 |
| GB | 2 140 345 A | 11/1984 | A43D/65/00 |

OTHER PUBLICATIONS

International Search Report from PCT/US03/17146 dated Aug. 21, 2003.

* cited by examiner

Primary Examiner—Thomas M. Dougherty
Assistant Examiner—J. Aguirrechea
(74) Attorney, Agent, or Firm—Senniger Powers

(57) ABSTRACT

An ultrasonic horn assembly for applying ultrasonic energy at an operating location which assembly includes a connector between horn assembly components which provides uniform clamping pressure between transfer faces of the components.

5 Claims, 5 Drawing Sheets

ULTRASONIC HORN ASSEMBLY STACK COMPONENT CONNECTOR

BACKGROUND OF INVENTION

This invention relates to an ultrasonic horn assembly having a connector for connecting two major stack components of the assembly together.

Ultrasonic horns are used to distribute ultrasonic energy in a variety of industrial processes. One example involves bonding of two thermoplastic sheets of material together in the manufacture of personal care products such as diapers.

Ultrasonic horn assemblies have a number of distinct components, which are connected in a stack. In one arrangement these components may include a power excitation device known as a converter (or driver assembly), amplitude modification devices known as boosters, and an ultrasonically energized tool known as a horn, which contacts a workpiece. These components have been connected to each other, for example, by use of a fully threaded, high strength steel stud. A drawback of this arrangement is that a high-pressure center contact area tends to form in the area immediately around the stud at the interface between the two stack components being connected. In particular, clamping forces are concentrated in an area immediately around the stud. The clamping pressure at the interface holding these two components together is significantly greater immediately around the stud than it is at the periphery of the mating surfaces remote from the stud. As such, the clamping force that holds the components together degrades peripherally away from the stud. As ultrasonic energy is transmitted across this interface over time during extended operation of the horn assembly, the variation in clamping force at the interface facilitates various wear phenomena such as fretting, as well as burning or oxide buildup, as the components are imperfectly joined. The variation itself degrades the efficiency of energy transfer, and the resulting wear and oxide build up further degrade this efficiency. To address this wear it is necessary to periodically disassemble the horn assembly and refinish the stack components at the interface therebetween.

SUMMARY OF THE INVENTION

It is therefore an object of the invention to provide an ultrasonic horn assembly which has reduced maintenance requirements for stack component interfaces, and which has more efficient energy transfer between stack components.

Briefly, therefore, the invention is directed to an ultrasonic horn assembly for transporting ultrasonic energy to an operating location to apply the ultrasonic energy to at least one article at the operating location. The horn assembly comprises a first stack component having at least one transfer face, an opening, and internal threads in the opening. There is a second stack component having at least one transfer face adapted to engage the transfer face of the first stack component at an interface for transmitting ultrasonic energy from one of the first and second stack components to the other, the second stack component having an opening and internal threads in the opening. There is a threaded stud adapted to connect the first and second stack components together with their transfer faces in engagement, the threaded stud extending through the interface and being free of connection to at least one of the first and second stack components along a segment of the stud passing through the interface.

The invention is also directed to an ultrasonic horn assembly having a connector which connects the first stack component to the second stack component by applying opposing clamping forces originating at locations within the first and second stack components, which opposing clamping forces oppose each other across the interface, and which connector is free of connection to at least one of the first and second stack components along a segment of the connector passing through a plane defined by the interface.

Another embodiment of the invention entails a connector connecting the second stack component to the first stack component, which connector grips the stack components at locations remote from the interface, pulls the stack components toward each other, and does not grip at least one of the first and second stack components at the interface between the components.

In another aspect the invention is an ultrasonic horn assembly having a connector connecting the second stack component to the first stack component, which connector passes through the interface between the components.without producing a high-pressure center contact area at a location where the connector passes through the interface.

The invenion is also directed to an ultrasonic horn assembly having a connector connecting the second stack component to the first stack component, which connector produces a contact pressure between the first and second stack components at the interface, which contact pressure varies by no more than about 30% across the interface.

Other objects and features will be in part apparent and in part pointed out hereinafter.

DETAILED DESCRIPTION OF THE PREFERRED EMBODIMENTS

The present invention provides an ultrasonic horn assembly for any of a variety of manufacturing operations, such as for bonding at least two continuously moving substrate webs together. The assembly is particularly useful for ultrasonically bonding selected components to absorbent articles using a rotary ultrasonic horn. Alternatively, the assembly is useful for bonding two webs together to form a composite material and subsequently using it as a component in an absorbent article such as, for example, a disposable diaper.

The present invention is particularly useful in the bonding of two or more layers of materials which preferably are made, at least in part, from thermoplastic polymers. In particular, the assembly can be used to ultrasonically bond stretchable outer ears to a disposable diaper using a rotary ultrasonic horn. The stretchable outer ears enhance the fit of the diaper about the waist of the wearer. The assembly may also be used to bond a fastening system to the outer ears of the diaper. In addition, the assembly may be used in the manufacture of other types of articles, such as, for example, training pants, feminine care products, incontinence garments, hospital gowns, and the like. All of such alternative configurations are contemplated as being within the scope of the present invention. The present invention may also be employed with, for example, a rotary ultrasonic horn configured to selectively perforate a material.

Figure 1:
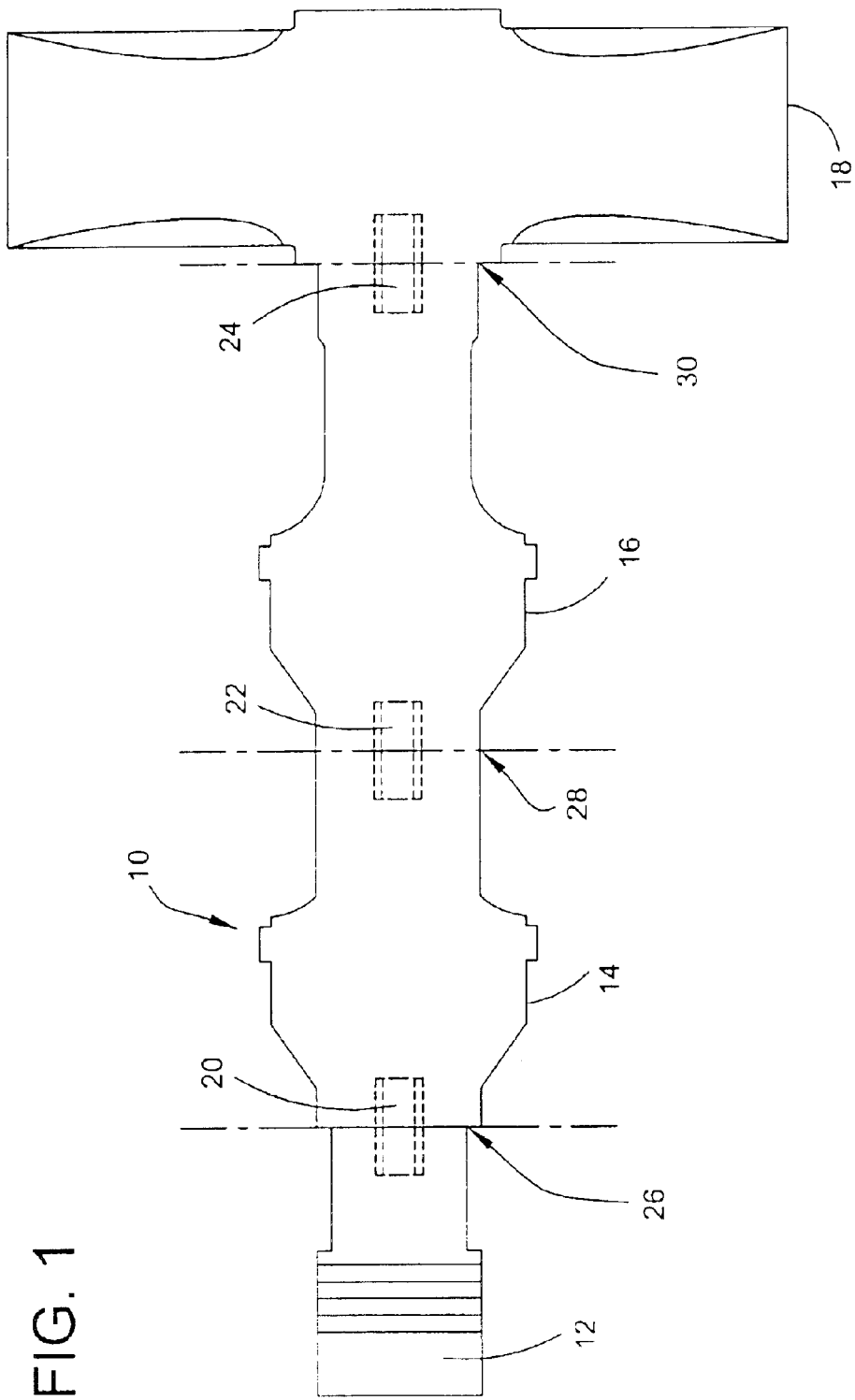
FIG. 1 is a schematic representation of an ultrasonic horn assembly.

FIG. 1 schematically illustrates an ultrasonic horn assembly 10 having a number of stack components including a converter 12, a secondary booster 14, a primary booster 16, and a horn 18. Connectors 20, 22, and 24 connect the various stack components at interfaces 26, 28, and 30.

In general, the ultrasonic horn 18 may be made from any metal having suitable acoustical and mechanical properties. Suitable metals include aluminum, monel, titanium and some alloy steels. In general, variables such as the diameter, mass, width, thickness and configuration of the ultrasonic horn 18 are not critical. However, the variables do determine the particular frequency and amplitude at which the ultrasonic horn resonates and vibrates.

In particular configurations, the ultrasonic horn 18 can be one which is excited at a frequency of from about 18 to about 60 kHz. The horn may have, for example, a diameter of from about 4 to about 20 centimeters and a width at the bonding surface of from about 0.6 to about 13 centimeters. The thickness of the horn at the rotational axis may be, for example, from about 0.06 to about 15 centimeters. The horn may have a mass in the range of from about 0.06 to about 30 kilograms. The diameter, width, and thickness of the horn are selected such that the horn, upon being excited by ultrasonic energy at a desired frequency, is adapted to resonate such that the excited end moves substantially in phase with the movement of the source of excitation and the opposed end and bonding surface move substantially out of phase with the excited end. Thus, upon subjecting the horn to ultrasonic excitation, the excited end moves in a direction towards the interior of the horn while the opposing end and the bonding surface move in the opposite direction which is also towards the interior of the horn. As such, the movements of the ends of the horn relative to each other are said to be out of phase.

The ultrasonic horn assembly 10 also includes a drive mechanism or converter 12 to ultrasonically excite the ultrasonic horn 18. Any mechanism which provides the desired excitation can be used in the present invention. Such mechanisms are well known to those skilled in the art. For example, the assembly may include a drive mechanism which is commercially available from Dukane Corporation located in St. Charles, Ill. or a similar system available from Branson Sonic Power Company located in Danbury, Conn. Typically, a generator, such as a Dukane 3000 watt, 20 kHz generator (Part No. 20A3005), is connected to a driver assembly, such as a Dukane driver assembly (Part No. 110-3716-0001), to provide the necessary ultrasonic excitation. Any combination of boosters 14 and 16, such as a Dukane 1:1 booster (Part No. 110-2510) and a Dukane 1.5:1 booster (Part No. 110-2512), may then be attached to the driver assembly. Finally, the rotary ultrasonic horn is attached to the boosters. Thus, the combination of the generator, drive assembly and boosters ultrasonically excites the ultrasonic horn 18 thereby providing the ultrasonic energy necessary to bond the substrate webs together, perforate a substrate, or otherwise carry out the desired operation.

The components include transfer faces for transmitting energy. A transfer face is a surface at the end of a component and is the surface through which ultrasonic energy is transferred to an adjoining component. For example, horn 18 has a transfer face 30 which engages a transfer face of booster 16 at interface 30. Ultrasonic energy is transferred from the booster to the horn across these transfer faces.

The assembly also includes an anvil (not shown) with which the horn acts, with the work piece therebetween. The anvil may be a stationary anvil, or may optionally be a rotating anvil roll as in the case of a rotating ultrasonic horn as described in U.S. Pat. Nos. 5,087,320, 5,096,532, 5,110,403, and 5,552,013 (all hereby incorporated by reference). The rotating anvil roll has an outer peripheral anvil surface located adjacent the energy transfer surface 4 of the horn. The anvil roll is configured to rotate about an anvil axis in a direction such that its bonding surface moves in the direction in which the work piece travels. In one specific bonding operation, substrate webs continuously move between the energy transfer face of the horn and the anvil.

Upon energization the ultrasonic horn cyclically expands and contracts, which expansion and contraction is the driving force for the bonding or other mechanical operation performed by the horn. For example, the horn expands and contracts a total amplitude of 0.005 inches (0.0125 cms) at a frequency of 20,000 cycles per minute. This translates to a total movement of 200 inches (500 cms) of movement per second. This movement corresponds to an energy value applied to the work piece traveling between the horn's energy transfer surface and the anvil. Some of the energy is simply returned as elastic reaction, and some of the energy is dissipated as heat, which heats or melts two plastic materials being processed.

The invention applies to any other type of ultrasonic equipment having joined components. One such alternative ultrasonic assembly to which the invention applies is a plunge-type ultrasonic system. In this type of system, there is a stationary anvil with a working surface, and an opposed working surface on an ultrasonic horn. Ultrasonic energy is transmitted by the horn in a direction perpendicular to the plane defined by the working surface of the anvil, thereby bringing the working surface of the horn into vibratory proximity with the working surface of the anvil. The work piece to be bonded, perforated, or otherwise worked upon is positioned between the respective working surfaces.

With specific regard to the connectors in FIG. 1, connector 20, for example, passes through the interface 26 without producing a high-pressure center contact area at the location where the connector passes through the interface. This can, for example, be achieved by a connector design which uniformly distributes the clamping forces across the interface. This uniform distribution of clamping forces is accomplished because the connector design produces clamping forces which originate at locations deep within the components rather than clamping forces which originate immediately where the connector passes through the interface. As such, there is no concentration of clamping forces around the connector. The contact pressure between the two adjoined stack components at the interface varies only moderately from one point on the interface to other points on the interface. From examination of pressure impressions made between stack component interfaces engaged according to the invention, a reasonable estimate is that the contact pressure varies by no more than about 30% across the interface.

As noted above, the connector is designed to eliminate the application of clamping forces originating at the interface, which is in contrast to previous connectors that had a fully threaded contact with components through the interface. The threads at the interface of previous connectors applied clamping forces immediately at the interface, in a manner which caused a high concentration of clamping forces right where the connector passes through the interface defining a high-pressure center contact area. The connector of the invention, in contrast, does not grip the stack components at the interface, but grips the stack components at locations remote from the interface, and pulls the stack components toward each other such that their mating ultrasonic energy transfer faces are in engagement.

Figure 2:
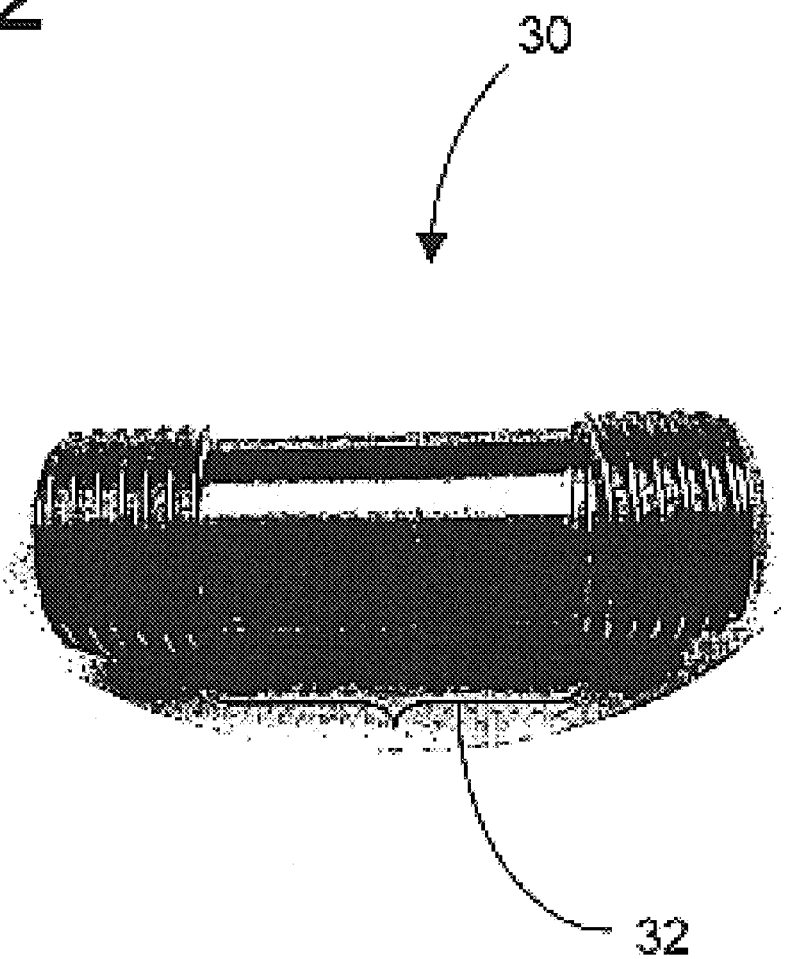
FIG. 2 is a photograph of a connector of the invention.

These features of the connector of the invention are especially evident by examination of a preferred embodiment of the connector illustrated in FIG. 2. This connector is a threaded stud 30 having a threadless longitudinal segment 32. When assembled into the horn assembly, the threadless longitudinal segment passes through the plane defined by one of the interfaces 26, 28, and 30 in FIG. 1. The threadless segment preferably occupies a length between about 50% and about 75% of the entire stud length. In one embodiment, the threadless segment is about 0.8 inches (2 cms) in length, corresponsding to about 65% of the entire stud length of between about 1.2 inches (3 cms) and about 1.5 (4 cms). The threads on the stud threadably engage internal threads within an opening on each of the components. Selecting a longer rather than a shorter threadless segment moves the clamping point deeper into the components, and results in more uniform distribution of clamping forces across the interface. On the other hand, if the threadless segment is too short, the improvement in uniformity can be negligible. As such, the threadless segment, that is, the segment which is free of connection through the interface, is at least about 0.25 inches (0.625 cms) in one embodiment. A minimum number of threads of about six is preferred in one embodiment in order to provide adequate securement. The overall length of the stud varies depending on the application, with a typical overall length in one application being between about 0.75 inch (1.9 cms) and about 2 inches (5 cms), and one preferred stud being about 1.5 inches (about 4 cms). Considering the foregoing, the threadless segment is selected to be at least long enough to reduce the high-pressure center contact area effect, and to be short enough for there to enough terminal threads to adequately clamp the components.

Transfer faces on each of the components are brought into engagement with each other by the stud. In view of the threadless segment, the connector is free of connection to the first and second stack components along the segment of the connector which passes through the plane defined by the interface. While there can be contact between the stud and the opening along this segment, there is no directly engaging gripping connection applying significant clamping forces. During operation, ultrasonic energy is transmitted from one stack component to an adjoining stack component across the respective transfer faces of the stack components at the interface.

The connector in one embodiment is a stud machined from from a cast titanium alloy, such as Ti6Al4V, which may be the same material as that from which selected horns and booster are manufactured.

While the foregoing specific embodiment describes one approach to achieving a connector which is free of connection to the stack components at the interface, there are other arrangements within the scope of the invention which provide a connector free of this connection. For example, a fully threaded stud can be employed in combination with openings on the stack components which lack threads at the interface. In this embodiment, it is the openings which have a threadless segment rather than the stud. The threadless segment in the openings is formed either by boring the threads out or by eliminating them upon original manufacture. Inasmuch as there are no threads in the openings for a distance each way from the interface, and therefore no threads in that segment to engage threads on the fully threaded stud, the stud is free of connection to the stack components at the interface along the threadless length within each opening.

The foregoing features of the connector of the invention and of the connection between stack components reduce the amount of heat generated at the interfaces, which may correspond to a slight increase in horn output amplitude. Fretting and spalling, which are the severe surface damage phenomena due to friction between poorly mated assembly interfaces, are substantially reduced or eliminated by this arrangement. Oxidation, the high temperature phenomenon which converts titanium on the component surface to black, hard, brittle titanium oxide which interferes with energy transfer, is also substantially reduced or eliminated.

In connecting two components in the horn assembly of the invention, a silicon fluid can optionally be applied to one or both of the mating energy transfer faces at the interface area before connecting to improve the connection. In high spots where the component surfaces physically touch, the fluid is forced away. In low spots where the component surfaces do not physically touch, the fluid is trapped and fills the low spots to provide contact. Any high and low spots on the energy transfer faces are on a micro-scale, as the surfaces are first lapped and polished to a surface which is level to within two millionths of an inch (five millionths of a cm). A standard silicon grease or fluid as is used in the industry for this purpose may be used.

The following examples further illustrate the invention.

EXAMPLE 1

Figure 3:
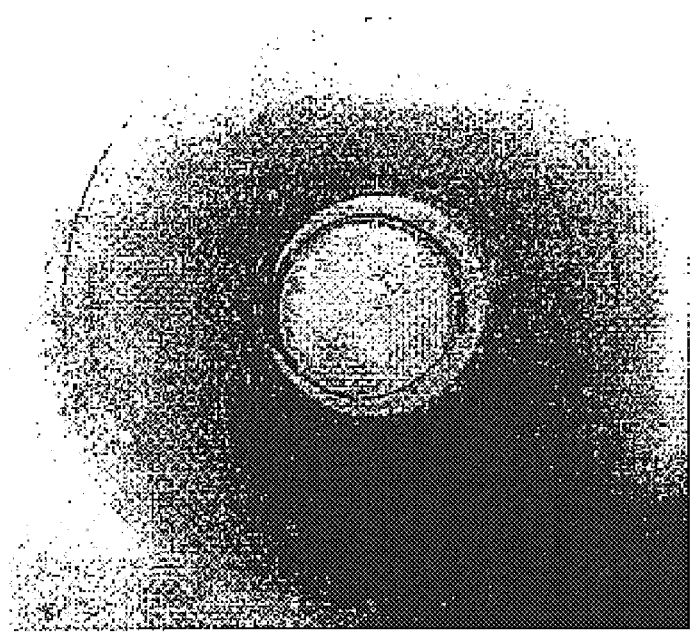
FIGS. 3 and 4 are photographs of impressions of stack component interfaces.
Figure 4:
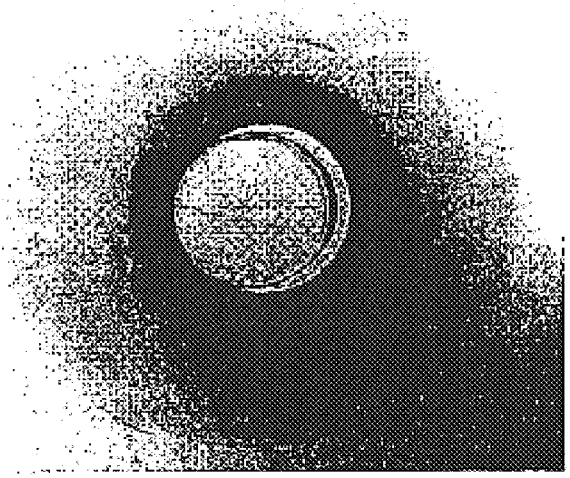

Horn assembly components were assembled using connectors of this invention and, for comparison, analogous components were connected using a fully threaded stud according to the prior practice. In connecting the components, a torque of 30 ft-lbs was applied in each instance. An impression of each of the respective interfaces where the energy transfer faces were brought into engagement was taken by installing a pressure sensing film (Fuji brand prescale film) between interfaces between the respective components. The impression of an exemplary booster interface of the assembly of the invention is illustrated in FIG. 3, and shows a relatively uniform pressure pattern represented by the relatively uniform darkness of the impression. The comparative impression of a booster interface is illustrated in FIG. 4, and shows a non-uniform pressure pattern represented by non-uniform darkness, with a concentration of darkness and therefore pressure at a high-pressure contact center area surrounding the stud location.

EXAMPLE 2

Figure 5:
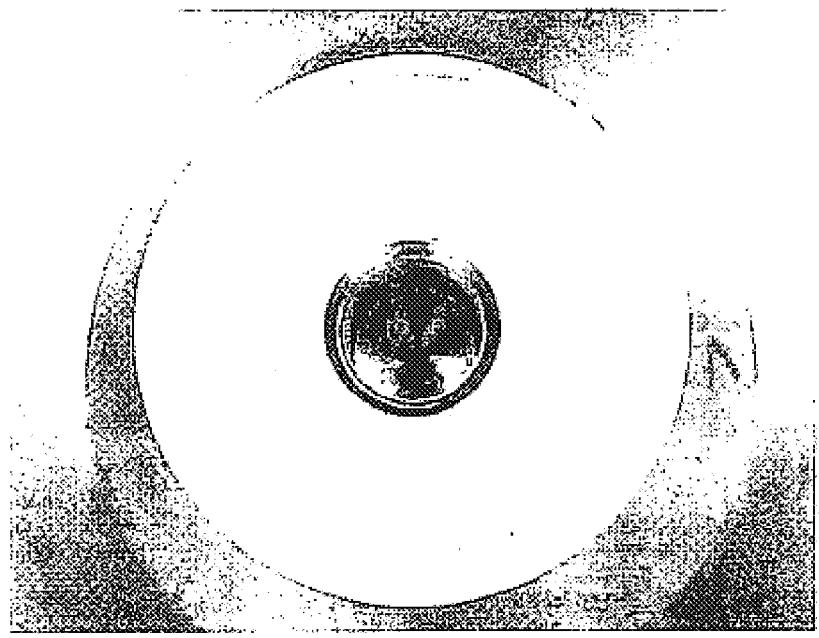
FIGS. 5 and 6 are photographs of interface surfaces of stack components.
Figure 6:
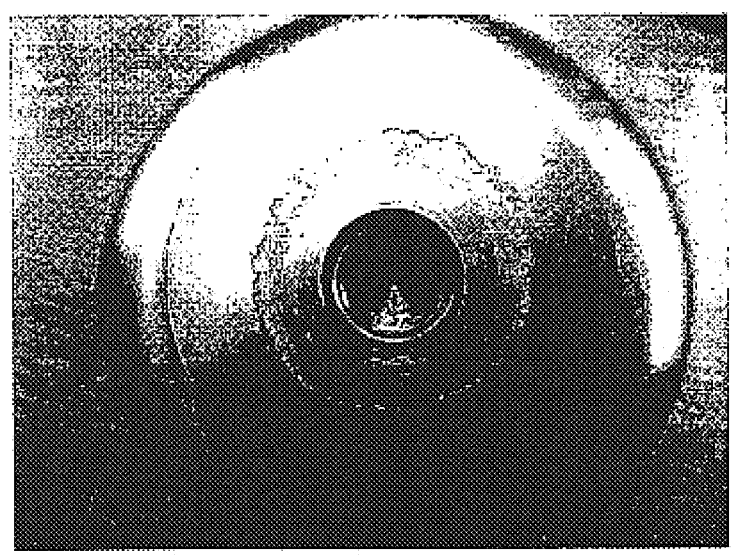

Ultrasonic stack components were assembled and ultrasonically driven for 8 hours at a frequency of 20,000 Hz using the stud of the invention. For comparison purposes, stack components were connected using a fully threaded standard stud. Upon disassembly, the respective energy transfer faces were examined. FIG. 5 is a photograph of the energy transfer face of an exemplary stack component having been connected with the stud of the invention, then operated as described. It reveals a wear-free, oxidation-free interface. The comparative energy transfer face corresponding to connection using a standard, fully threaded stud is illustrated in FIG. 6, and reveals an uneven wear pattern, fretting, and oxidative burning.

EXAMPLE 3

Figure 7:
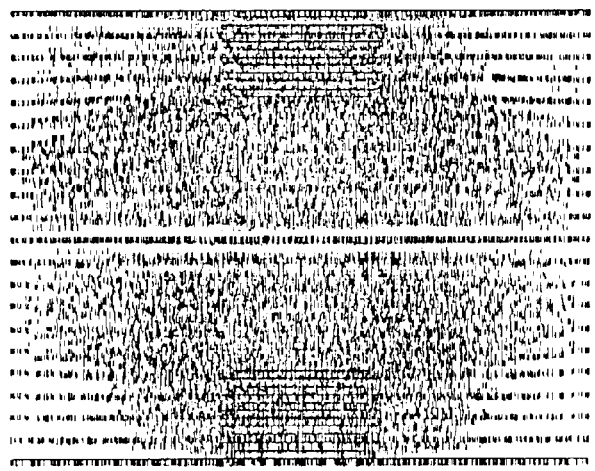
FIGS. 7 and 8 are computer-generated finite elemental analyses illustrations of force distribution by stack component connectors.
Figure 8:
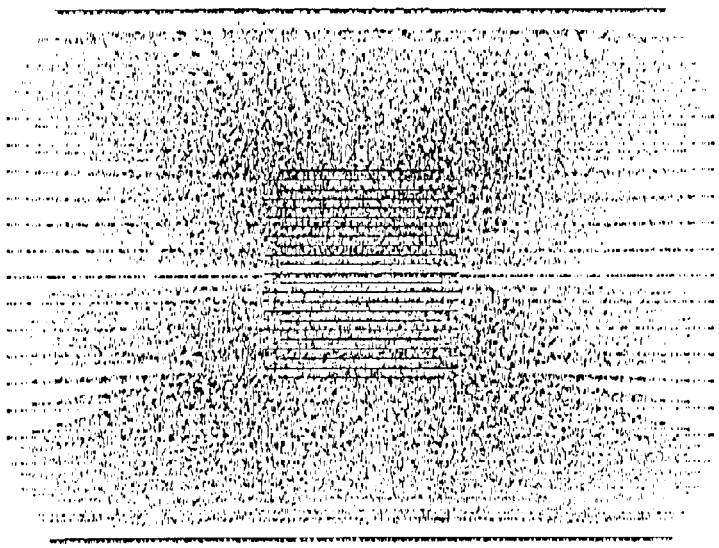

The clamping forces generated by the connector of the invention and fully threaded comparative connector discussed in Examples 1 and 2 were computer modeled using finite element analysis, and illustrations prepared therefrom are presented in FIGS. 7 and 8. FIG. 7 shows that with the invention the clamping forces are distributed relatively uniformly across the interface. FIG. 8 shows that with a conventional, fully threaded stud, a signficant portion of the clamping forces concentrates around the stud at the interface, and a significant portion radiates away from the interface.

In view of the above, it will be seen that the objects of the invention are achieved. As various changes could be made in the above-described horn assembly without departing from the scope of the invention, it is intended that all matter contained in the above description be interpreted as illustrative and not in a limiting sense.

What is claimed is:

1. An ultrasonic horn assembly for transporting ultrasonic energy to an operating location to apply the ultrasonic energy to at least one article at the operating location, the horn assembly comprising:

a first stack component having at least one transfer face;

a second stack component having at least one transfer face adapted to engage the transfer face of the first stack component at an interface for transmitting ultrasonic energy from one of the first and second stack components to the other;

a connector which connects the first stack component to the second stack component by applying opposing clamping forces originating at locations within the first and second stack components, which opposing clamping forces oppose each other across the interface, and which connector is free of directly engaging gripping connection to at least one of the first and second stack components along a segment of the connector passing through a plane defined by the interface; and wherein the segment of the connector which is free of directly engaging gripping connection constitutes between about 50% and about 75% of the overall length of the connector.

2. The ultrasonic horn assembly of claim 1 wherein the connector is free of connection to the first stack component along the segment of the connector passing through the plane defined by the interface, and wherein the connector is free of connection to the second stack component along the segment of the connector passing through the interface.

3. The ultrasonic born assembly of claim 1 wherein the first stack component is an ultrasonic horn booster and the second stack component is an ultrasonic horn.

4. The ultrasonic horn assembly of claim 1 wherein the first stack component is a first ultrasonic horn booster and the second stack component is a second ultrasonic horn booster.

5. The ultrasonic horn assembly of claim 1 wherein the first stack component is an ultrasonic horn assembly drive mechanism and the second stack component is an ultrasonic horn booster.

* * * * *